United States Patent
Phillips

[19]

[11] Patent Number: 5,961,186
[45] Date of Patent: Oct. 5, 1999

[54] QUICK-RELEASE BICYCLE AXLE FASTENER

[75] Inventor: Cal M. Phillips, Platteville, Wis.

[73] Assignee: S.A.F.E.-Q.R. Corporation

[21] Appl. No.: 08/850,162

[22] Filed: May 2, 1997

Related U.S. Application Data

[60] Provisional application No. 60/032,223, Dec. 2, 1996.

[51] Int. Cl.$^6$ .................................................. B60B 27/00
[52] U.S. Cl. ...................................... 301/124.2; 301/110.5; 301/110.6
[58] Field of Search ............................. 301/124.2, 110.5, 301/110.6

[56] References Cited

U.S. PATENT DOCUMENTS

| | | | |
|---|---|---|---|
| 2,630,020 | 3/1953 | Juy | 74/242.14 |
| 3,922,018 | 11/1975 | Shook | 301/105 B |
| 4,033,627 | 7/1977 | Morroni | 301/111 |
| 4,079,958 | 3/1978 | Segawa | 280/279 |
| 4,400,038 | 8/1983 | Hosokawa | 301/111 |
| 4,679,862 | 7/1987 | Luo | 301/112 |
| 4,724,692 | 2/1988 | Turin et al. | 70/225 |
| 4,763,957 | 8/1988 | Poehlmann et al. | 301/110.5 |
| 4,770,011 | 9/1988 | Constant | 70/225 |
| 4,789,206 | 12/1988 | Ozaki | 301/111 |
| 4,805,941 | 2/1989 | Downing et al. | 280/279 |
| 4,906,053 | 3/1990 | Kawai | 301/110.5 |
| 4,964,287 | 10/1990 | Gaul | 70/233 |
| 5,121,973 | 6/1992 | Phillips | 301/110.5 |
| 5,383,716 | 1/1995 | Stewart et al. | 301/124.2 |
| 5,567,020 | 10/1996 | Phillips et al. | 301/124.2 |

FOREIGN PATENT DOCUMENTS

| | | | |
|---|---|---|---|
| 995747 | 12/1951 | France | 301/124.2 |
| 441058 | 10/1948 | Italy . | |
| 460058 | 10/1950 | Italy . | |
| 463954 | 2/1951 | Italy . | |
| 341220 | 1/1931 | United Kingdom . | |
| 658726 | 10/1951 | United Kingdom | 301/124.2 |

*Primary Examiner*—D. Glenn Dayoan
*Assistant Examiner*—Long Bao Nguyen
*Attorney, Agent, or Firm*—John V. Stewart

[57] ABSTRACT

A control rod (20) through a hollow axle (30) has a lever-operated cam (2) on one end which pushes a follower (8) against a first safety drop-out (50). On the opposite end of the control rod is an adjustment nut (15) surrounded by a safety interlock slide (11). When the cam is loose, a compression spring (19) urges the safety slide inward toward the second drop-out (50) where it is retained by a conventional safety tab or lip (51). The compression spring imparts enough tension on the control rod to pull the cam follower against the first drop-out, thus retaining the axle in the drop-outs despite a loose cam. To release the axle, first the cam is opened, then the slide is pulled outward with the fingers while the thumb pushes the adjustment nut inward, as with a hypodermic needle. Installation of the axle is the reverse of these steps, ending with closing the cam, with no need to readjust the nut. A conical compression spring (9) at each end of the axle centers the control rod laterally for easy insertion and removal of the axle in and out of the drop-outs.

6 Claims, 6 Drawing Sheets

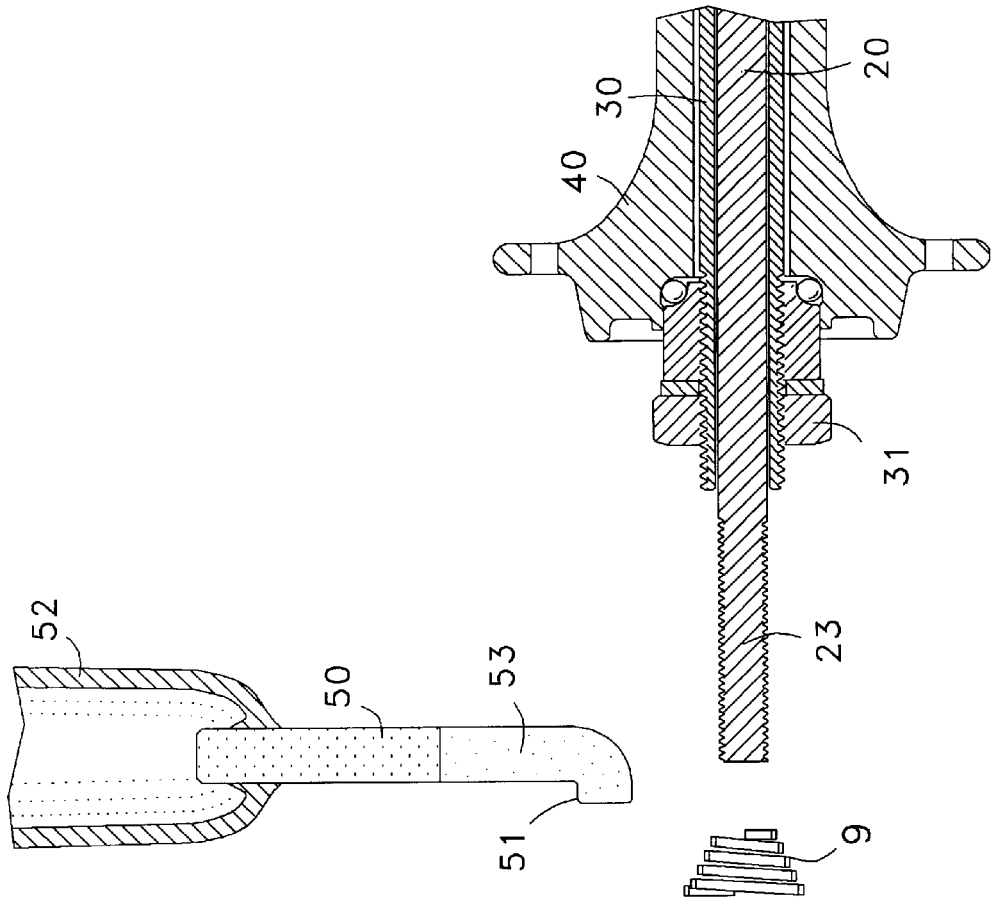
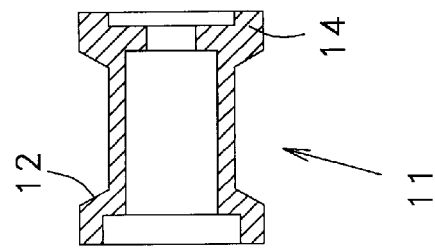
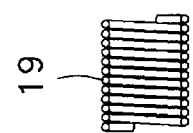
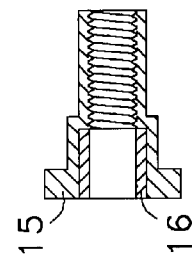
FIG 5

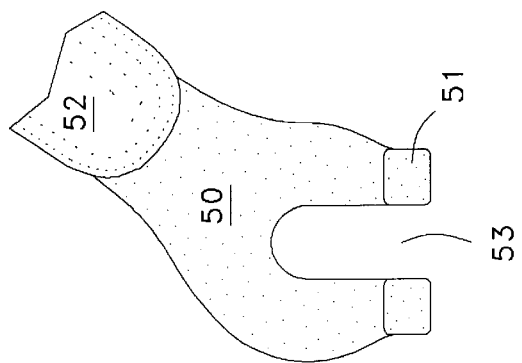
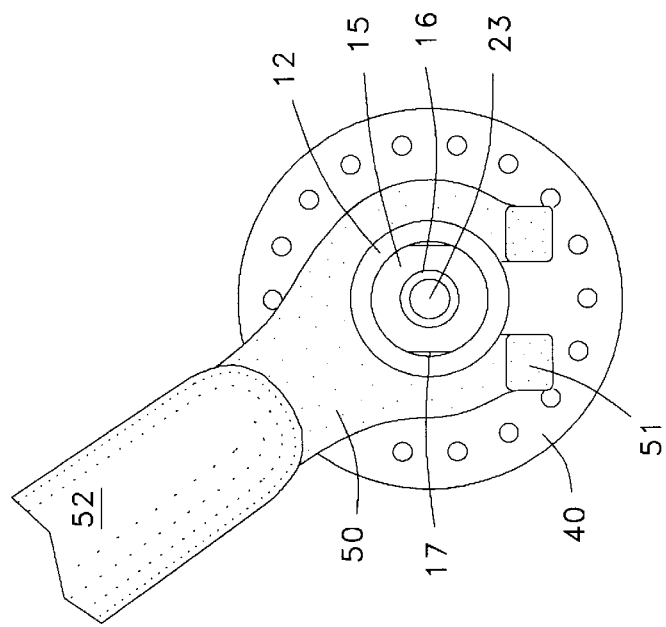
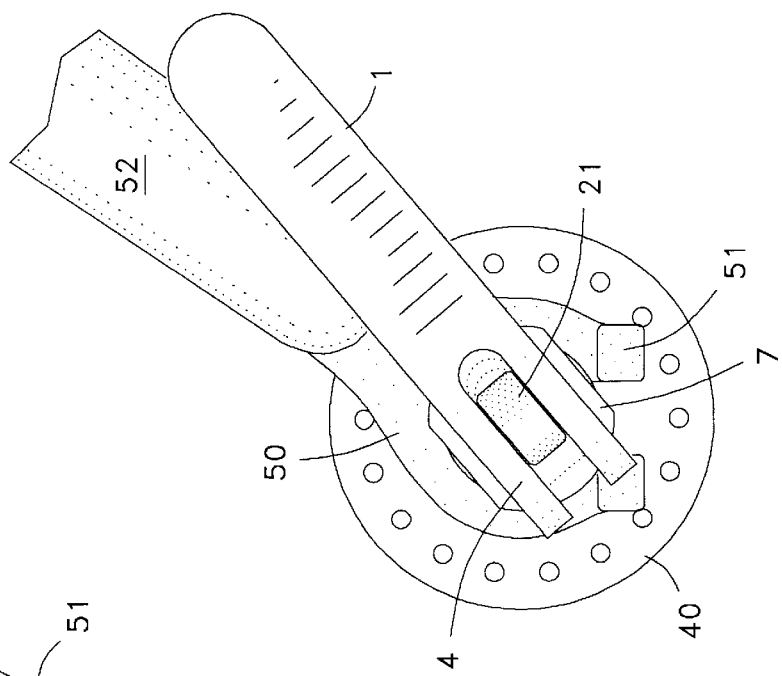

QUICK-RELEASE BICYCLE AXLE FASTENER

CROSS REFERENCE TO RELATED APPLICATION

The Applicant claims for this invention the filing priority date of provisional patent application Ser. No. 60/032,223, of Cal M. Phillips, Filed Dec. 2, 1996.

BACKGROUND OF THE INVENTION

1. Field of the Invention

This invention is in the field of bicycle axle fasteners, especially cam-operated quick-release types.

2. Description of Prior Art

Conventional quick-release bicycle axle fasteners have a control rod passing through the center of a hollow axle. On one end of the control rod is a lever-operated cam with a follower which presses inward against the axle mounting plate, or drop-out. The opposite end of the control rod is threaded, and has an adjustment nut, which is pulled inward against the opposite drop-out by tension on the control rod. The dropouts are thus clamped firmly between the cam follower and bearing nut on one side, and between the adjustment nut and the other bearing nut on the other side. The dropouts have safety tabs which prevent accidental release of the axle when the cam is open. To release the axle, first the cam must be opened, then the adjustment nut must be manually loosened to clear the safety tabs. This is inconvenient, and results in total loss of the control-rod tension setting, which is controlled by the adjustment nut. The user must re-establish the tension adjustment by trial and error each time the axle is remounted, defeating the idea of a quick-release. Many users are not competent to set this critical adjustment. A poorly adjusted control rod may be too tight, and break, or too loose, and allow the wheel to wobble or detach from the drop-outs.

U.S. Pat. No. 4,805,941 (Segawa, FIGS. 4,5) discloses a quick-release bicycle axle fastener with a safety interlock. His clamping mechanism needs enough range to fully relax the spring (6) of the interlock, since no radial lip is provided for its disengagement from the drop-out with the fingers. Thus, his interlock is inactive when it is needed most, in the released position of the cam lever. When partially rotated, his cam lever is releasable by impact or vibration, defeating the safety. The safety interlock in the present invention works even in the fully released position of the cam lever.

U.S. Pat. No. 5,121,973 (Phillips) discloses a push-button quick-release bicycle axle fastener. It retains the axle by urging a slide under spring force into a special coupling surface on the outer surface of the drop-out. It does not use a cam, or require readjustment for each operation, but it requires a custom drop-out. The present invention uses standard safety drop-outs, and uses a lever-operated cam to clamp the axle firmly to the drop-outs.

U.S. Pat. No. 5,567,020 (Phillips and Stewart) discloses in FIG. 15 a quick-release bicycle axle fastener with a control rod (18) passing through a hollow axle (49). One end of the rod has a cam (1M) which operates a cam follower (15), and the other end has an opposing adjustment nut (11). The cam follower is urged by a spring (13) toward the safety drop-out (43), to provide backup retention of the axle if the cam is open. The follower has a finger grip (16) for release from the safety retention tab (47) of the drop-out. The cam provides enough displacement to clear both safety drop-outs. Disadvantages of this design are as follows: It makes a conforming cam follower impractical, since the follower must leave the cam to perform the interlock function, thus losing its orientation with the cam. To avoid closing the cam on a disoriented follower, a flat cam follower should be used. However, a flat cam follower does not distribute the cam force, and therefore cannot be made of plastic for the smoothest operation. It also allows the cam and control rod to turn relatively easily in the closed position, thus changing the adjustment. Conical centering springs are not practical with this design, since one of them would resist the safety spring (13). These disadvantages are overcome in the present invention.

SUMMARY OF THE INVENTION

The objectives of the present invention are generally to provide a quick-release bicycle axle fastener that is quicker, safer, and more convenient than prior types, at a competitive cost. A particular objective is to provide backup retention of the axle in conventional safety drop-outs despite a loose cam, without necessitating adjustment of the cam tension each time the axle is fastened to the drop-outs.

These objectives are achieved as follows: A control rod (20) through a hollow axle (30) has a lever-operated cam (2) on one end which pushes a follower (8) against a first safety drop-out (50). On the opposite end of the control rod is an adjustment nut (15) surrounded by a safety interlock slide (11). When the cam is loose, a compression spring (19) urges the safety slide inward toward the second drop-out (50) where it is retained by a conventional safety tab or lip (51). The compression spring imparts enough tension on the control rod to pull the cam follower against the first drop-out, thus retaining the axle in the drop-outs despite a loose cam. To release the axle, first the cam is opened, then the slide is pulled outward with the fingers while the thumb pushes the adjustment nut inward, as with a hypodermic needle. Installation of the axle is the reverse of these steps, ending with closing the cam, with no need to readjust the nut. A conical compression spring (9) at each end of the axle centers the control rod laterally for easy insertion and removal of the axle in and out of the drop-outs.

BRIEF DESCRIPTION OF THE DRAWINGS

FIG. 5 Shows an exploded view of the push-button slide release mechanism.

FIG. 6 Shows a side view of a safety drop-out on a bicycle fork.

FIG. 7 Shows a side view of the finder-operated slide and button.

FIG. 8 Shows a side view of the axle fastener with the cam in closed position.

REFERENCE NUMERALS

Figure 1:
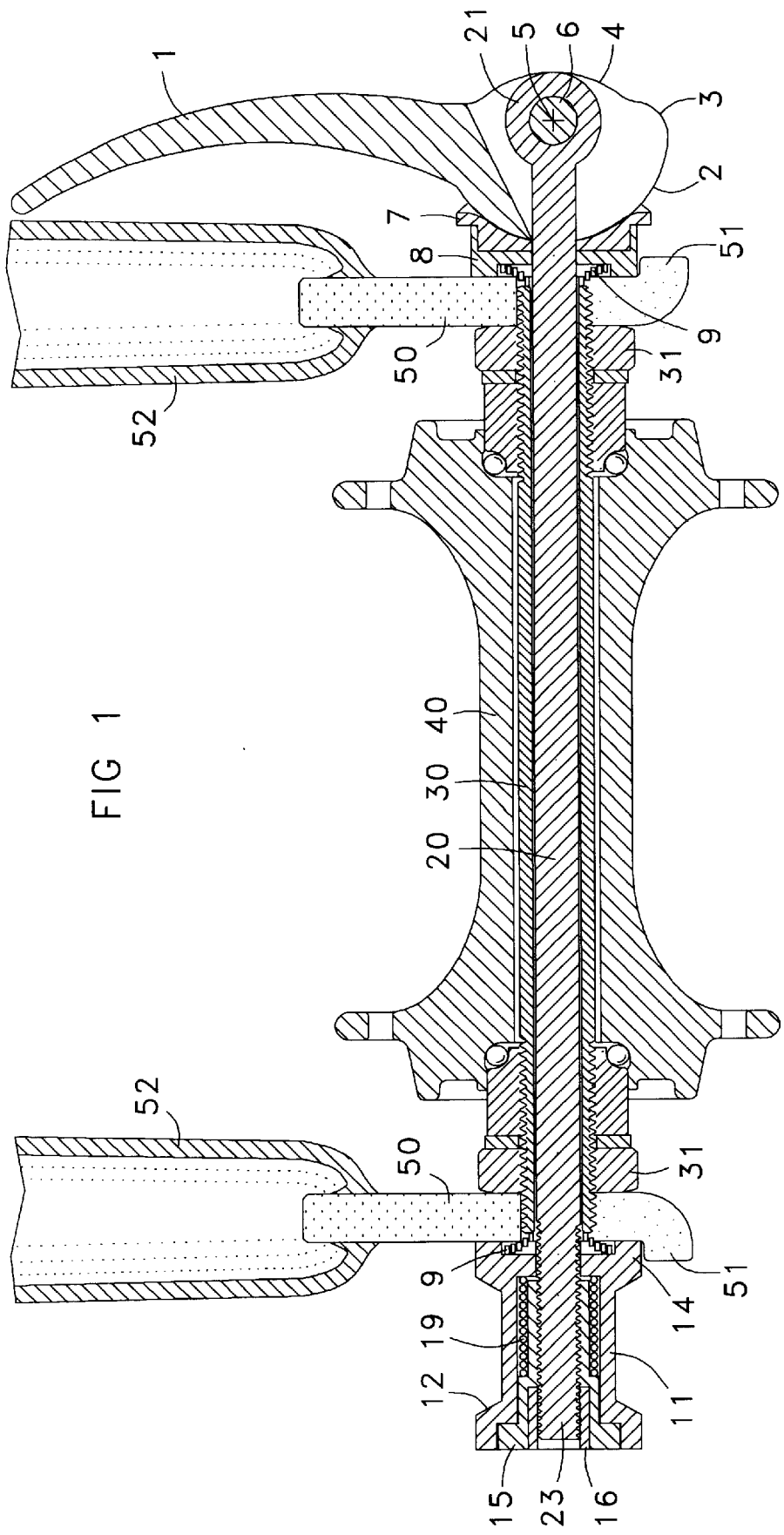
FIG. 1 Shows a front sectional view of the axle fastener in locked position.
Figure 2:
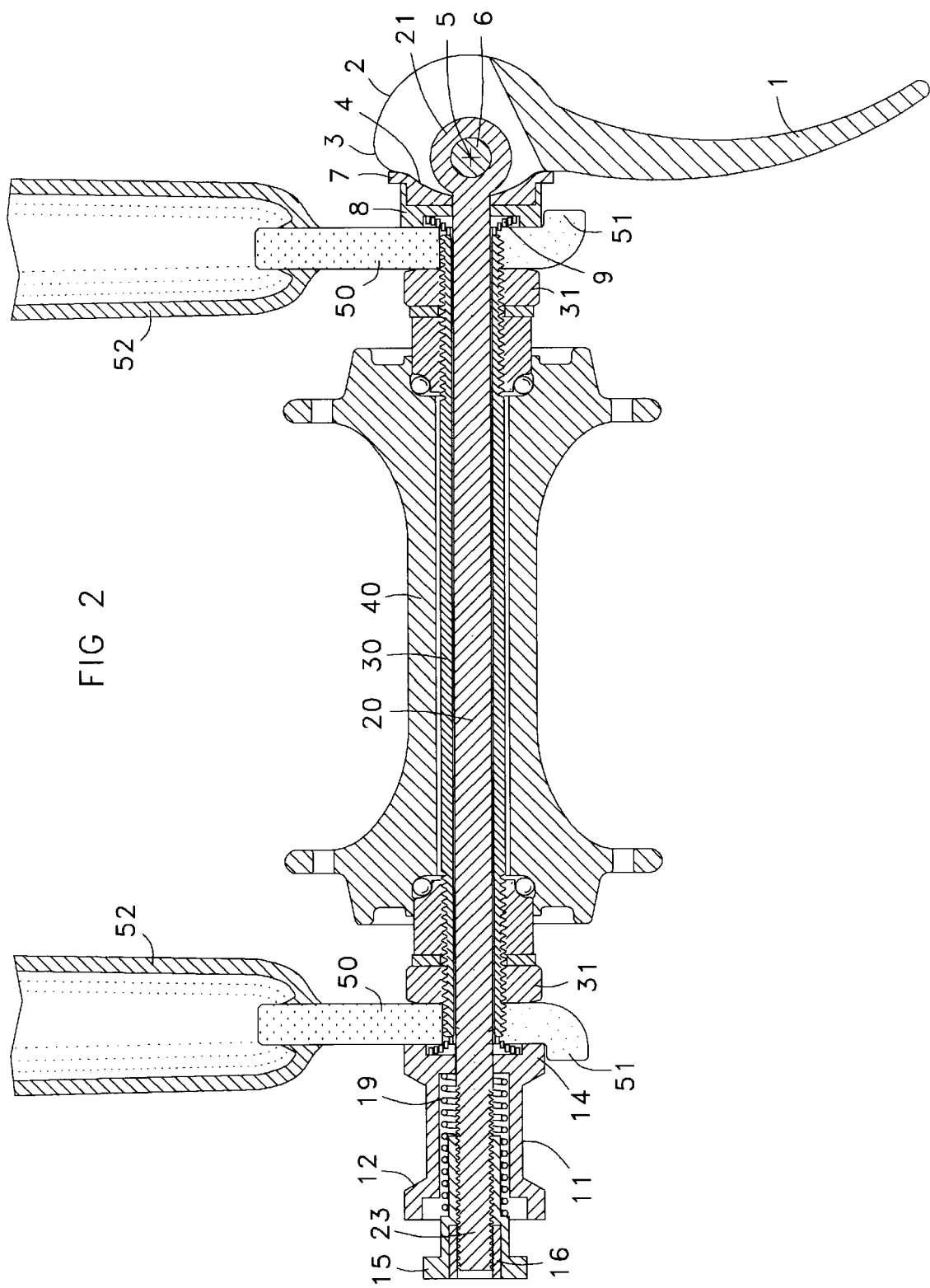
FIG. 2 Shows the axle fastener with the cam lever (1) open. The safety interlocks (8 and 14) remain engaged by retention tabs (51).
Figure 3:
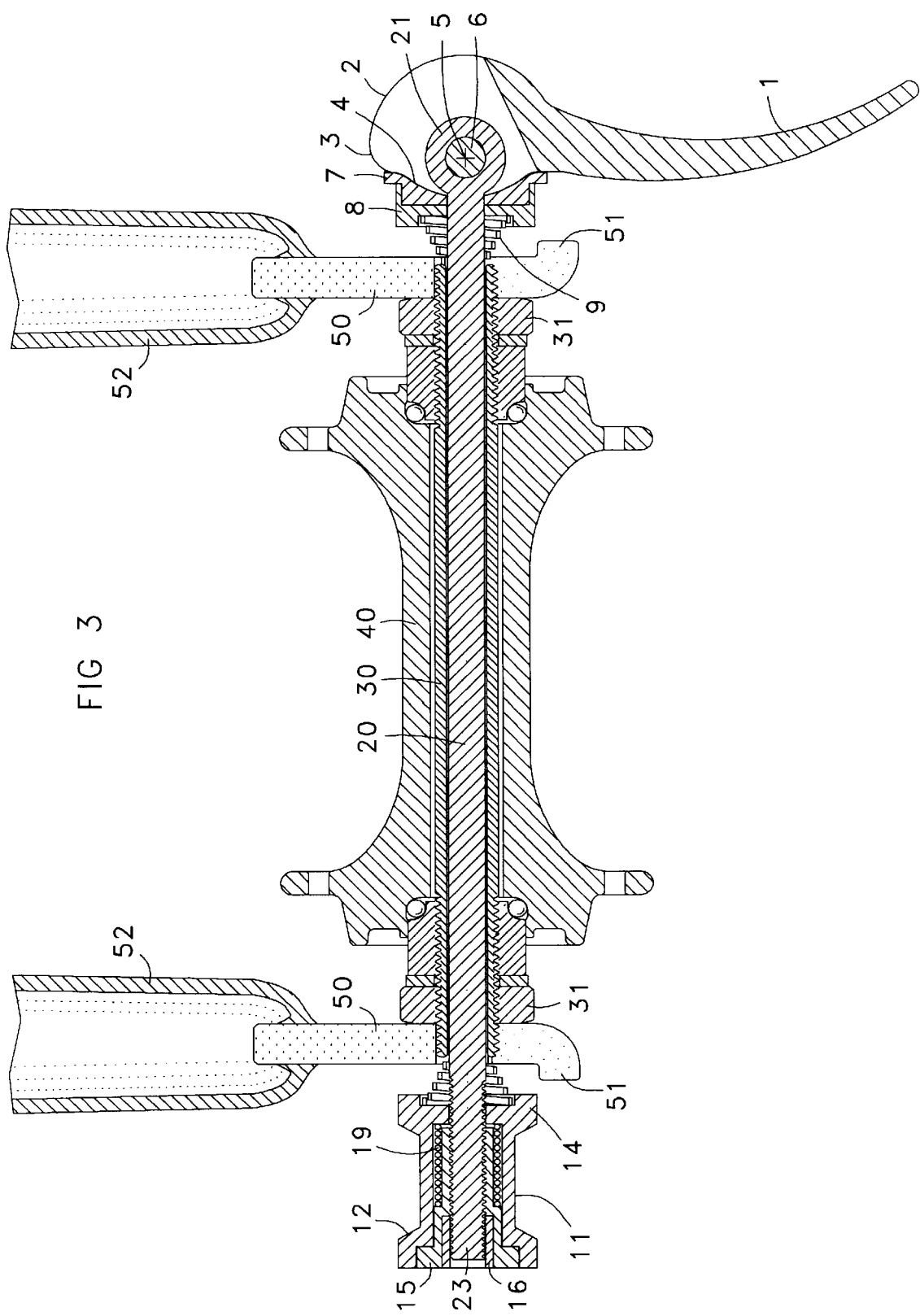
FIG. 3 Shows the axle fastener with safety interlocks disengaged by finger operation of the button (15) and slide (11) as with a hypodermic needle.
Figure 4:
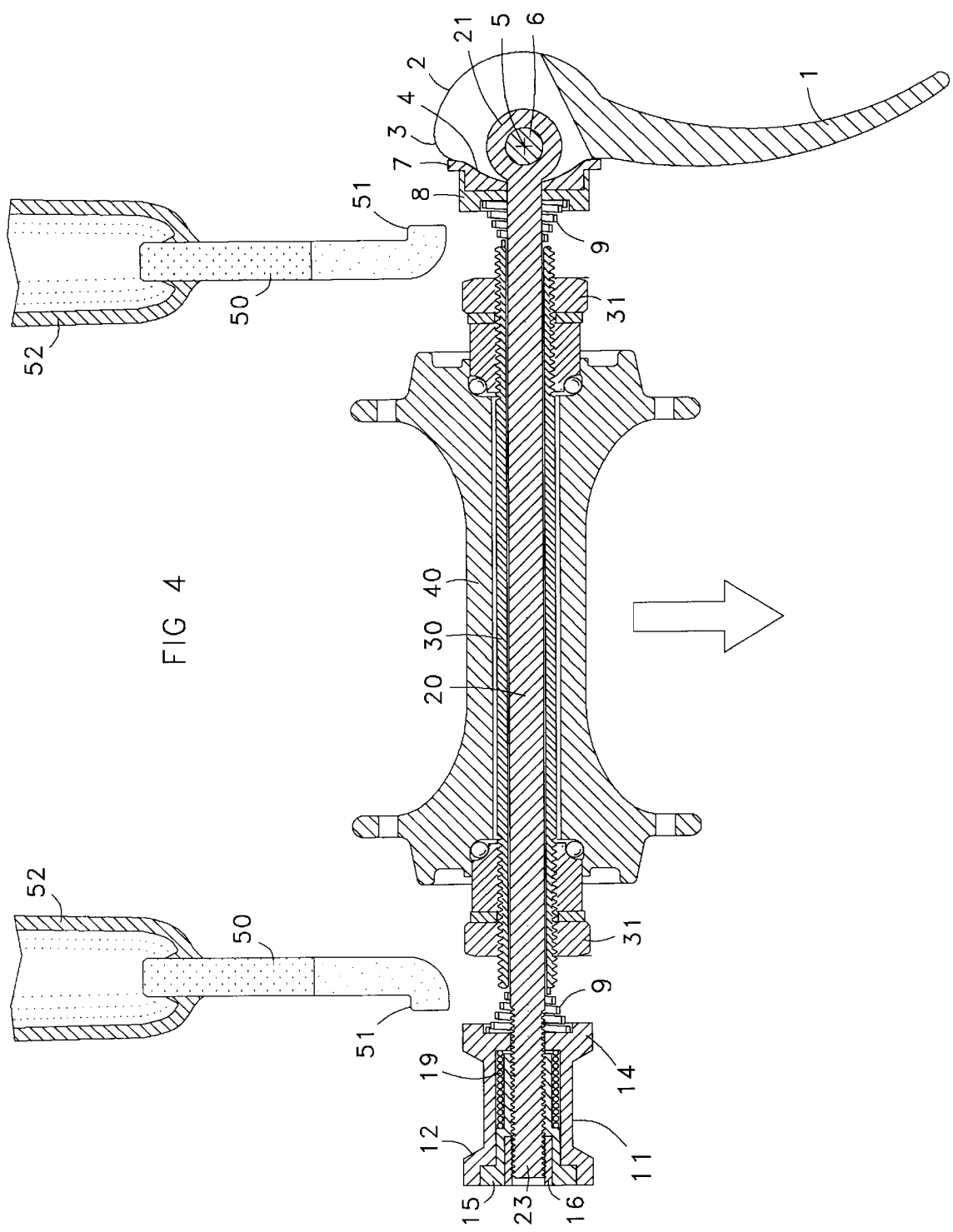
FIG. 4 Shows the axle being removed from the drop-outs.

1. Lever for cam
2. Main lobe of cam for creating clamping force
3. Intermediate lobe of cam provides fast initial cam movement 4. Minimum side of cam
5. Cam pivot center
6. Cam pivot pin
7. Portion of cam follower that conforms to main lobe of cam
8. Cam follower and safety interlock washer
9. Conventional conical springs center the control rod in the axle
11. Finger-operated safety interlock slide
12. Finger grip on safety interlock slide
14. Inner end of safety interlock slide retained by safety tab (51)
15. Push-button on end of axle also serves as the cam tension adjustment nut
16. Thread-lock in push-button to maintain cam tension adjustment
17. Flat sides of push button to receive wrench for adjustment of cam tension
19. Interlock spring—a compression spring urging the slide (11) inward
20. Control rod inside hollow axle (30)
21. Cam end of control rod having head with hole for pivot pin (6)
23. Threaded end of control rod (20)
30. Hollow axle
31. Bearing lock nut
40. Hub of wheel
50. Safety drop-out
51. Tab or other retention surface on drop-out
52. Fork or frame member to which drop-out is attached
53. Open-ended slot in drop-out

TERMINOLOGY

Cam displacement: The distance the cam follower moves during one cycle between the maximum and minimum excursions of the cam.

Drop-out: Axle mounting plate attached to each lower end of a bicycle fork and seat stay. It has an open-ended slot to receive the axle.

Safety drop-out: A drop-out with coupling means to retain the axle despite a loose adjustment nut or cam on the axle fastener. Commonly, a depression or tab on the outer surface of the drop-out is used to retain the cam follower and adjustment nut.

Inward, inner, inboard: Axially toward or nearer the center of the axle.

Outward, outer: Axially away or farthest from the center of the axle.

DESCRIPTION OF THE PREFERRED EMBODIMENTS

FIG. 1 shows a control rod (20) passing through the center of a hollow axle (30). On one end of the control rod is a lever-operated cam (2) with a follower (8) which presses inward against the axle mounting plate, or drop-out (50). The opposite end of the control rod (23) is threaded, and has an adjustment nut (15) which is pulled inward against the opposite drop-out by tension from the control rod. The drop-outs are thus clamped firmly between the cam follower and bearing lock nut (31) on one side, and the adjustment nut and the other bearing lock nut on the other side. The dropouts have safety tabs (51) which prevent accidental release of the axle when the cam is open.

To release the axle, first the cam is opened, then the adjustment nut (15) is pushed by the thumb while pulling on the finger grips (12) of the slide (11) as with a hypodermic needle. This increases the distance between the inner end of the slide (14) and the interlock washer (8), allowing both parts to clear the respective safety tabs (51), releasing the axle from the drop-outs. Conical springs (9) are located between each end of the axle and the respective interlocking part (8, 14). This centers the control rod, so that clearance is equal on both sides, making insertion and removal of the axle easier.

No readjustment of control rod tension is needed for re-attachment of the axle, as with current cam-operated quick-release bicycle axle fasteners. Adjustment is made once with a wrench on the flats (17) of the adjustment nut (15) seen in FIG. 7. This adjustment is not lost by operating the device. The adjustment nut is held in position on the threads of the control rod by means such as a nylon thread lock (16) or thread locking compound.

The cam (2) provides enough displacement for clearance between the inner surfaces of the interlock parts (8, 14) and the outer surfaces of tabs (51) on safety drop-outs. Total cam displacement must be greater than the combined depths of the two safety tabs. Any cam with adequate displacement may be used. The preferred cam (shown) has a main lobe (2) providing low displacement with high gain, and an intermediate lobe providing high displacement with low gain. When closing the cam, most of the clearance is quickly eliminated by the intermediate lobe (3) under insignificant load. This maximizes the remaining angular distance in which the main lobe (2) can operate, to achieve high clamping force using minimal effort. The cam follower (8) preferably has a portion (7) which conforms to the main lobe of the cam, distributing the contact force between the cam and follower. This distribution of force allows the conforming portion (7) to be made of a plastic that provides low friction and low wear.

The adjustment nut preferably has an annular shelf for retaining the outer end of a compression spring (19). The interlock slide (11) has an inner end with an annular shelf for retaining the inner end of the compression spring. Thus, the compression spring acts between the adjustment nut and the interlock slide to urge the interlock slide axially inward toward the middle of the control rod. This causes it to engage the safety tab of the drop-out, and to tension the control rod enough to pull the cam follower (8) into its respective drop-out, retaining both ends via the safety tabs when the cam is open. The adjustment nut also has an annular shelf which stops the interlock slide from moving outward past the adjustment nut. This shelf presses the interlock slide into the drop-out when the cam is closed.

Although the present invention has been described herein with respect to preferred embodiments, it will be understood that the foregoing description is intended to be illustrative, not restrictive. Many modifications of the present invention will occur to those skilled in the art. All such modifications which fall within the scope of the appended claims are intended to be within the scope and spirit of the present invention. This axle fastener may be used on all types of velocipedes.

I claim:

1. A quick-release bicycle axle fastener for attaching a hollow axle between two axle mounting plates having open-ended slots, the axle fastener comprising:

a control rod having an axis, a middle, a first end, and a threaded second end;

a cam follower, axially slidably mounted on the first end of the control rod;

a cam pivotally mounted on the first end of the control rod for pushing the cam follower axially inward toward the middle of the control rod;

an adjustment nut threaded on the second end of the control rod;

a slide having outer and inner ends, the slide mounted axially slidably on the second end of the control rod;

a finger grip on the slide for pulling the slide outward;

a spring acting between the adjustment nut and the slide urging the slide inward toward the middle of the control rod; and the slide restrained against outward movement by the adjustment nut;

whereby the adjustment nut can be turned to adjust the outward stopping point of the slide.

2. The quick-release bicycle axle fastener of claim 1, wherein the control rod is longer than the hollow axle and passes through the axle, and further comprising: a first conical compression spring mounted on the control rod between the axle and the cam follower; and a second conical compression spring mounted on the control rod between the axle and the slide.

3. The quick-release bicycle axle fastener of claim 1, wherein the cam has a main lobe with low displacement and high gain, and an intermediate lobe with high displacement and low gain, and the sliding cam follower has a surface which contacts the cam and conforms to the main lobe of the cam.

4. A quick-release bicycle axle fastener for attaching a hollow axle between two axle mounting plates having open-ended slots, the axle fastener comprising;

a control rod having a middle, a first end, and a second end;

a cam follower, axially slidably mounted on the first end of the control rod;

a cam pivotally mounted on the first end of the control rod for pushing the cam follower axially inward toward the middle of the control rod;

an adjustment nut on the second end of the control rod;

a safety interlock slide mounted axially slidably on the second end of the control rod, the slide encircling the adjustment nut;

a finger grip on the safety interlock slide;

a spring acting between the adjustment nut and the safety interlock slide, urging the safety interlock slide inward toward the middle of the control rod; and the slide stopped against outward movement by the adjustment nut.

5. The quick-release bicycle axle fastener of claim 4, wherein the control rod is longer than the hollow axle, passes through the axle, and further comprising a first conical compression spring mounted on the control rod between the axle and the cam follower, and a second conical compression spring mounted on the control rod between the axle and the slide.

6. The quick-release bicycle axle fastener of claim 4, wherein the cam has a main lobe with low displacement and high gain, and an intermediate lobe with high displacement and low gain, and the sliding cam follower has a surface which contacts the cam and conforms to the main lobe of the cam.

* * * * *